March 31. 1925.
J. L. BRADSHAW
CHEESE CUTTER
Filed Feb. 28, 1924
1,532,034
3 Sheets-Sheet 1
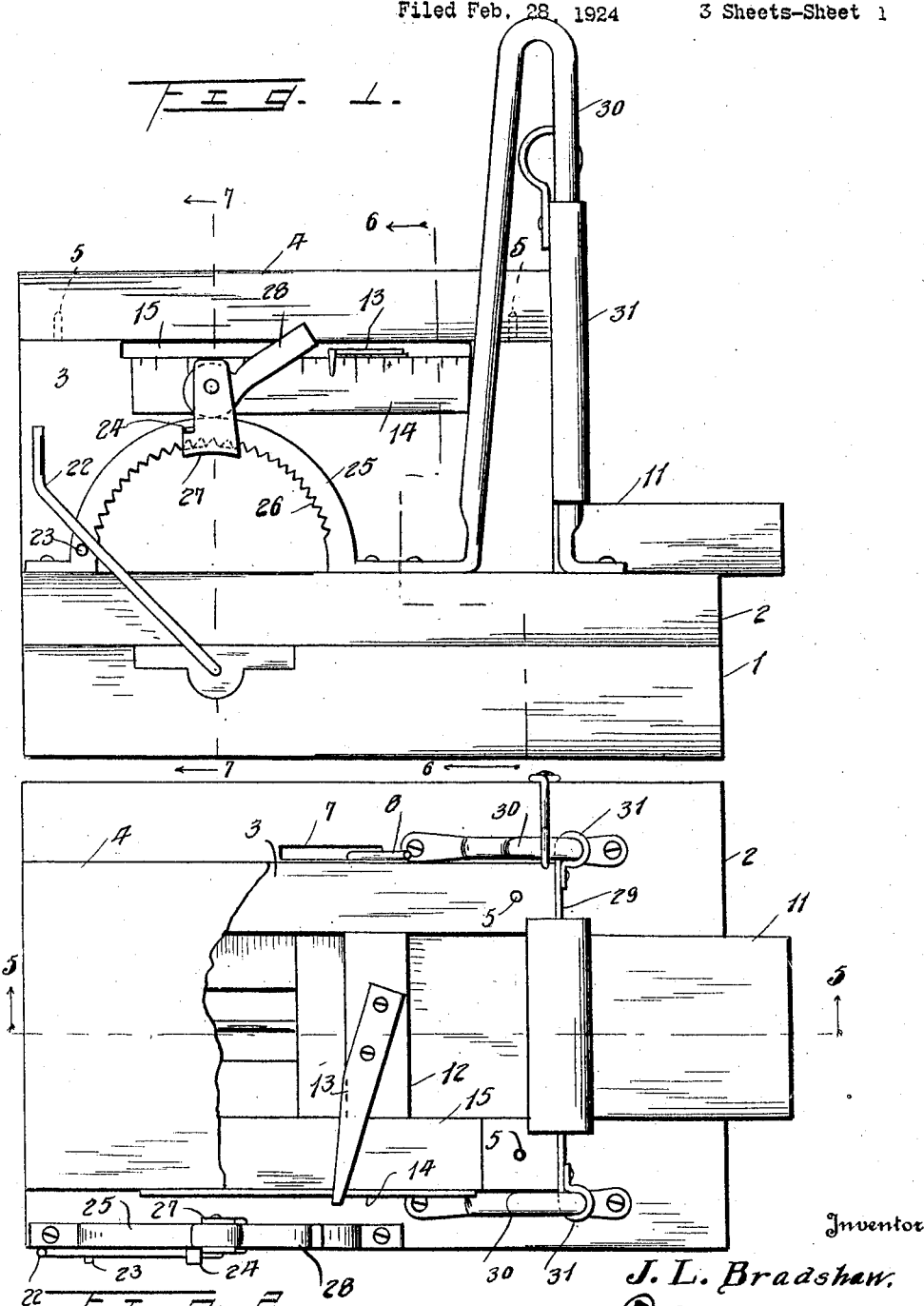

March 31, 1925.  1,532,034
J. L. BRADSHAW
CHEESE CUTTER
Filed Feb. 28, 1924  3 Sheets-Sheet 2
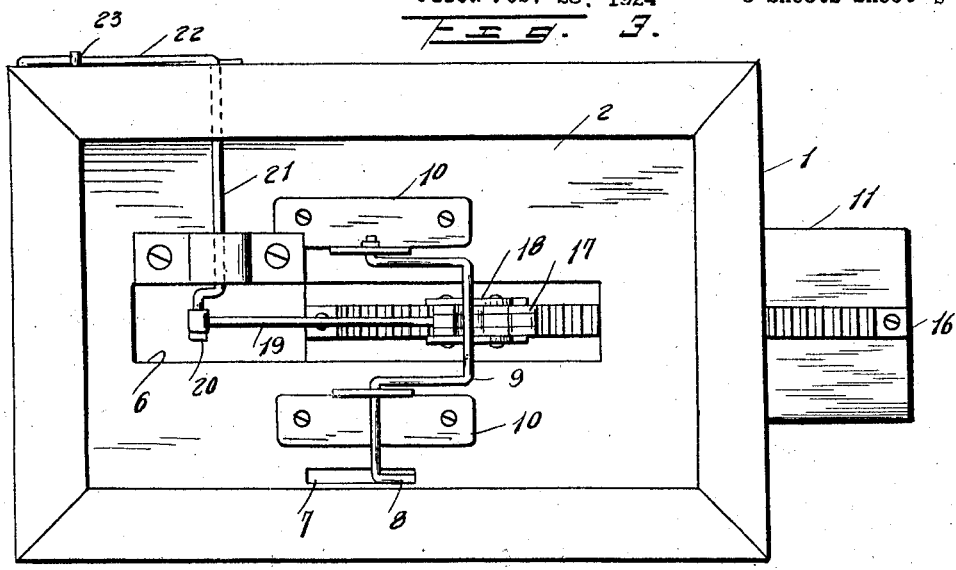
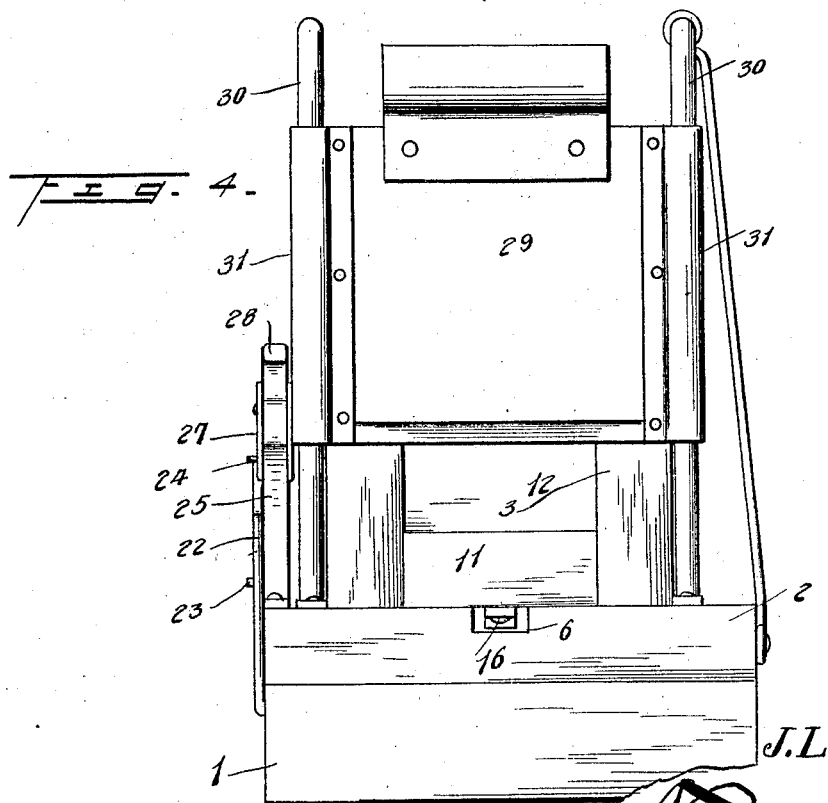
Inventor
J. L. Bradshaw,
By
Attorney March 31. 1925.
J. L. BRADSHAW
CHEESE CUTTER
Filed Feb. 28, 1924
1,532,034
3 Sheets-Sheet 3
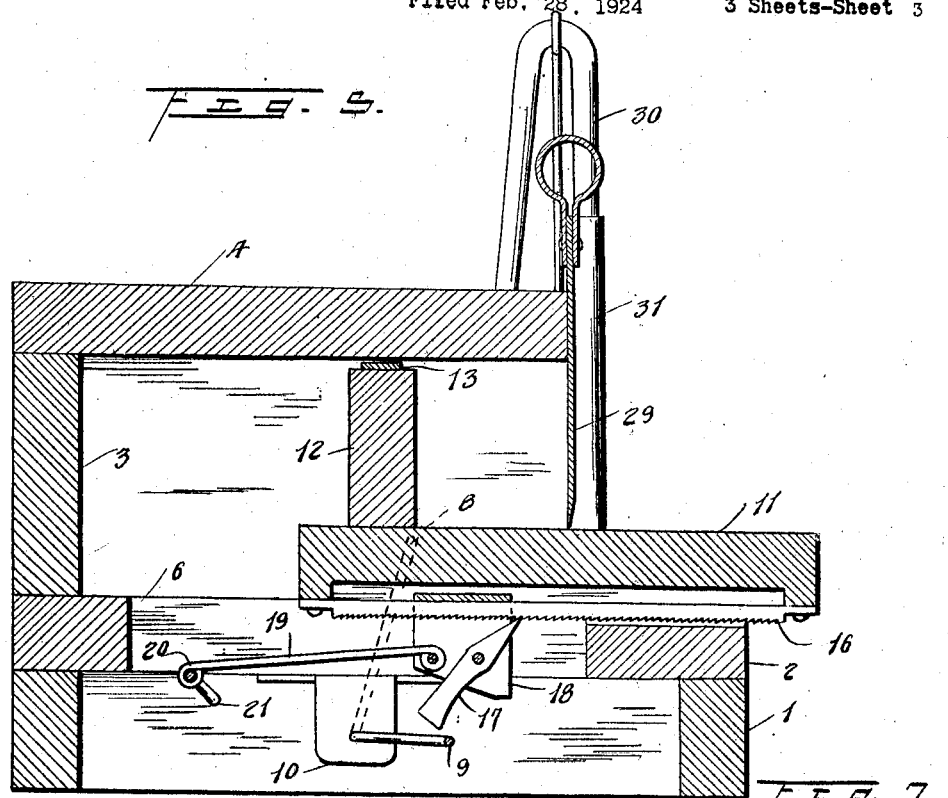
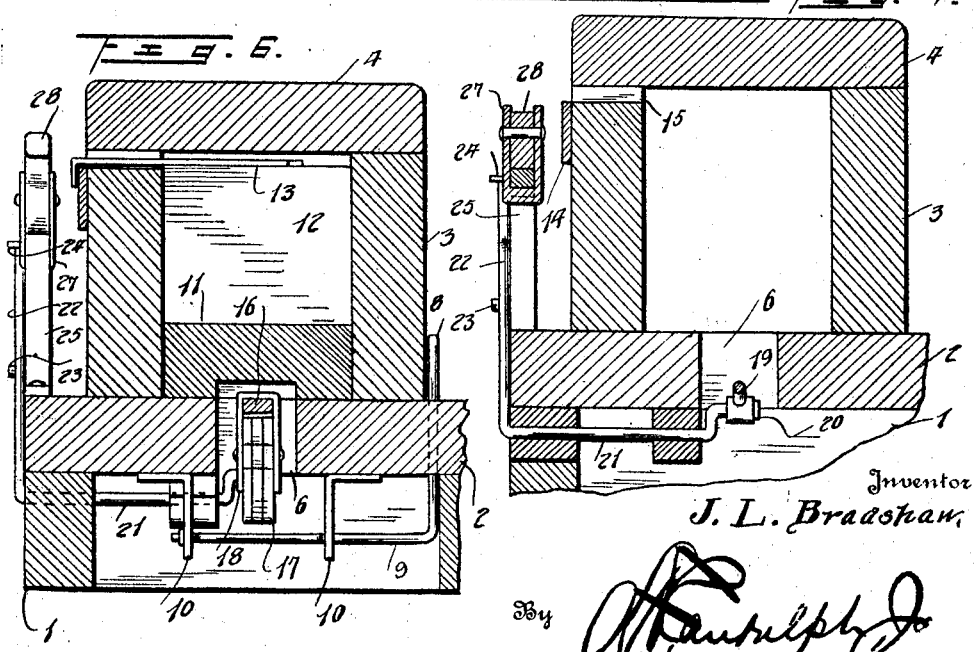
Inventor
J. L. Bradshaw,
By
Attorney

Patented Mar. 31, 1925.

1,532,034

UNITED STATES PATENT OFFICE.

JOE L. BRADSHAW, OF ELBRIDGE, TENNESSEE.

CHEESE CUTTER.

Application filed February 28, 1924. Serial No. 695,815.

*To all whom it may concern:*

Be it known that I, JOE L. BRADSHAW, a citizen of the United States, residing at Elbridge, in the county of Obion and State of Tennessee, have invented certain new and useful Improvements in Cheese Cutters; and I do hereby declare the following to be a full, clear, and exact description of the invention, such as will enable others skilled in the art to which it appertains to make and use the same.

The present invention relates to a slicing machine, the same being designed principally for cutting cheese into slices or portions of predetermined size and quantity so that any required amount by weight may be cut from a piece in bulk to approximately the required weight. While the machine is designed chiefly for cutting up cheese into any required amount, it is to be understood that other commodities, such as meat, fish, and other food, may be sliced or cut into required amounts.

Other objects and advantages will be apparent and suggest themselves as the nature of the invention is understood.

While the drawings illustrate an embodiment of the invention it is to be understood that in adapting the same to meet different conditions and requirements, various changes in the form, proportion, and minor details of construction may be resorted to without departing from the spirit of the invention.

Referring to the accompanying drawings forming a part of the application:

Figure 1 is a side view of a slicing machine embodying the invention,

Figure 2 is a top plan view thereof, a portion of the cover being broken away,

Figure 3 is an inverted or bottom view of the machine,

Figure 4 is a front view thereof,

Figure 5 is a vertical longitudinal section on the line 5—5 of Figure 2,

Figure 6 is a vertical transverse sectional view on the line 6—6 of Figure 1, and Figure 7 is a vertical transverse sectional view on the line 7—7 of Figure 1.

Corresponding and like parts are referred to in the following description and designated in the several views of the drawings by like reference characters.

The machine embodies a base including an under frame 1 and a table 2 mounted thereon. A box 3 is mounted upon the base and is open at its front and top, the latter being closed by means of a cover 4 which is retained in place by means of pins 5 projecting vertically from the box and entering openings formed in the cover. A longitudinal slot 6 is formed centrally of the table 2 and a second slot 7 is formed in a side portion of the table to receive a lever 8 at one end of a crank shaft 9 mounted in brackets 10 depending from the table 2 and disposed upon opposite sides of the slot 6.

A platform 11 is slidably mounted upon the table 2 and is provided at its inner or rear end with an upright 12 which constitutes a follower to engage and advance the cheese or other commodity to be sliced. The platform 11 fits snugly between the sides of the box 3 and the upright or follower 12 is provided with a pointer 13 which is adapted to move over a scale 14 so as to indicate the thickness of the slice being cut. The upper edge of the side of the box provided with the scale 14 is cut away, as indicated at 15, to provide clearance for the pointer 13.

A rack bar 16 is attached to the under side of the platform 11 and coacts with a dog 17 carried by a slide 18 and preferably pivoted thereto. A link 19 connects the slide 18 with the crank portion 20 of a shaft 21 mounted transversely of the under frame 1 and provided at its outer end with a lever 22. Upon oscillating the lever 22, the slide 18 is reciprocated and the dog 17 carried thereby alternately engages the teeth of the rack bar 16 and intermittently advances the platform 11 and the commodity placed thereon to be cut up into slices. The advance of the platform 11 at each operation of the lever 22 determines the thickness of the slice and this is controlled by two stops 23 and 24, the stop 23 being fixed and the stop 24 adjustable. A curved bar 25 mounted upon the base at one side of the box 3 is toothed, as indicated at 26, and the teeth coact with a slide 27 mounted upon the bar 25 to hold said slide in the required adjusted position. The slide 27 carries the stop 24 and a cam latch 28 mounted upon the slide coacts with the toothed bar 25 to hold the slide in the required adjusted position. The amplitude of movement of the lever 22 is determined by the stops 23 and 24, as will be readily understood.

A cutter 29 operates across the open front of the box 3 and cuts the cheese or other commodity into slices. The cutter 29 consists of a blade and is retained in place and directed in its movements by guides 30 which are attached to the base. Each of the guides consists of a rod doubled upon itself and attached to the table 2 at the sides of the box 3, the forward members of the bent rods engaging sleeves 31 at the vertical edges of the cutting blade 29.

The cheese or other commodity to be sliced is placed upon the platform 11 and against the follower 12 and is received within the box 3, the same being protected by the cover 4 and the cutter 29 which close the top and the front of the box respectively. The slide 27 is bent to regulate the movement of the lever 22 and the feed of the platform 11 and when the cutter 29 is elevated, the lever 22 is thrown forward into engagement with the stop 24, thereby moving the platform 11 and the article placed thereon, after which the cutter 29 is depressed, thereby cutting off a portion of the article which corresponds to a slice of the required thickness.

What is claimed is:

1. A slicing machine comprising a base, a platform thereon, a cutter, a ratchet mechanism for advancing the platform including an operating lever, stops on the exterior of the machine for regulating the throw of the operating lever, a slide carrying one of said stops, and means for securing the slide in the required adjusted position.

2. A slicing machine of the class described having a table, a box on said table, a platform slidable on said table and within the box adapted to carry the material to be cut, a cutter associated with said platform, an operating mechanism for said platform including a handle disposed exteriorly of the device, a bar rising from said table on the exterior thereof and offset with respect to said box, and stop means to limit the movement of the handle to determine the thickness of the slice and carried by said bar.

3. A slicing machine of the class described having a table, a box on said table, a platform slidable on said table and within the box adapted to carry the material to be cut, a cutter associated with said platform, an operating mechanism for said platform including a handle disposed exteriorly of the device, a bar rising from said table on the exterior thereof and offset with respect to said box, and stop means to limit the movement of the handle to determine the thickness of the slice and carried by said bar, said stop means including a slide adjustably mounted on said bar.

4. A slicing machine comprising a base including a table having an opening therein, a platform movable on the base, a cutter, a ratchet bar carried by the platform, a slide thereon, a dog carried by the slide and adapted to coact with the teeth of the ratchet bar, a crank shaft, a link connection between said slide and the crank portion of the crank shaft, an operating lever associated with the crank shaft, means exteriorly of the machine for regulating the throw of the operating lever to determine the feed of the platform and the thickness of the slice to be cut, and a trip mechanism for releasing the dog to admit of return of the platform to a given position.

In testimony whereof I affix my signature in presence of two witnesses.

JOE L. BRADSHAW.

Witnesses:
   E. A. WATSON,
   W. T. SHIVES.